United States Patent [19]

Olson

[11] 4,323,597

[45] Apr. 6, 1982

[54] PROCESS FOR PRODUCING AN ULTRAVIOLET RADIATION STABILIZED POLYMERIC ARTICLE

[75] Inventor: Daniel R. Olson, Schenectady, N.Y.

[73] Assignee: General Electric Company, Pittsfield, Mass.

[21] Appl. No.: 187,508

[22] Filed: Sep. 15, 1980

[51] Int. Cl.$^3$ .................... B05D 7/02; B05D 3/02; B05D 7/24

[52] U.S. Cl. .................................. 427/160; 427/384

[58] Field of Search ............................. 427/160, 384

[56] References Cited

U.S. PATENT DOCUMENTS

| | | | |
|---|---|---|---|
| 3,043,709 | 7/1962 | Amborski | 427/160 |
| 3,309,220 | 3/1967 | Osteen | 427/160 |
| 3,617,330 | 11/1971 | Peilstocker | 427/160 |
| 4,146,658 | 3/1979 | Humphrey | 427/160 |

*Primary Examiner*—James R. Hoffman
*Attorney, Agent, or Firm*—William F. Mufatti

[57] ABSTRACT

A process for producing an ultraviolet radiation stabilized polymeric, particularly polycarbonate, article comprising impregnation of the surface layers of said article with an ultraviolet radiation absorber by first applying onto the surface of said article an ultraviolet radiation stabilizing composition containing an ultraviolet radiation absorber and a nonaggressive liquid carrier, and then heating the article with the stabilizing composition on its surface to a temperature sufficient for said absorber to diffuse into the surface layers of said article but insufficient to deleteriously affect the properties of the polymer.

8 Claims, No Drawings

PROCESS FOR PRODUCING AN ULTRAVIOLET RADIATION STABILIZED POLYMERIC ARTICLE

This invention relates to polycarbonate resin and more particularly to a process for producing shaped polycarbonate articles exhibiting superior resistance to ultraviolet radiation.

BACKGROUND OF THE INVENTION

The vast majority of all organic polymeric materials undergo some mode of degradation when exposed to the high energy photons of ultraviolet radiation. The degradation manifests itself depending on the polymeric material in yellowing, discoloration, embrittlement and other loss of physical properties. Polycarbonate resin is no exception and it is, therefore, an object of this invention to provide a method of producing a polycarbonate resin article which is highly resistant to ultraviolet light degradation.

The use of ultraviolet radiation absorbers with various resins such as polyesters, polyolefins, vinyls, and polystyrene to provide protection against attack by ultraviolet radiation is known in the art. The ultraviolet radiation absorber functions by reason of its ability to screen out the damaging ultraviolet portion of light due to its very high absorptivity relative to that of the polymer. In order to qualify as a successful ultraviolet light absorber for a polymer, particularly for polycarbonate, there are several requirements which the absorber must fulfill. The absorber must have a high specific absorptivity in the range of wave lengths that are most deleterious to the polymer and that are present in the source of the exposure. The absorber must be compatible with the polymer such as polycarbonate and must not degrade the polymer with the loss of properties and increase in color. The absorber must not significantly absorb in the visible region of the spectrum or a color will be imparted to the polymer to which it has been added. The absorber must also have a sufficiently low volatility to permit its continued residence in the polymer.

Several methods are known in the prior art utilizing these ultraviolet radiation absorbers to stabilize various polymers, including polycarbonate, against ultraviolet radiation. These methods include blending the ultraviolet radiation absorbers with the polymer prior to processing; incorporating the absorbers in surface laminating or coating materials which are applied onto the surface of the processed polymer; and impregnating the absorbers in the polymer surface. The surface impregnation techniques known in the prior art include (i) using aggressive solvents to swell or soften the polymer surface thereby allowing the absorber to diffuse into the softened surface of the polymer; (ii) melting the absorber and the polymer surface in order to diffuse the molten absorber into the molten polymer surface; and (iii) partitioning of the absorber between a polymeric surface and a relatively poor solvent for the absorber held at high temperatures whereby the absorber, which is more soluble in the polymer than in the solvent, diffuses into the polymer surface.

While each of these methods can be utilized to impart improved ultraviolet stability to a polymer system, each of them has certain disadvantages. Blending the absorber with the bulk polymer results in the absorber being distributed throughout the entire polymer system. This procedure is both uneconomical, as these absorbers are usually quite expensive, and not completely successful. Since most of the absorber resides in the polymers interior instead of at the surface where it is most needed, much of the harmful ultraviolet radiation penetrates and deteriorates the surface of the polymer structure before reaching the majority of the interiorly distributed absorber. Furthermore, since the concentration of the absorber in the resin is limited by the degree of compatibility of the absorber with the polymer, using sufficiently high concentrations of absorber effective to provide surface protection generally tends to adversely affect the physical properties of the polymer. Incorporating the absorbers in surface laminating or coating materials suffers from the disadvantage of being generally difficult and expensive to use since an extra complicated processing step is required. Furthermore, difficulties are sometimes encountered in adhering the coating or laminating material to the surface of the polymer, or in maintaining continued adequate adhesion, especially after exposure to weathering. Even when the coating or laminating material adheres well, it often cannot be applied without forming unsightly streaks on the polymer surface. An additional drawback to this method is that often the physical properties of the polymer, such as impact strength, are adversely affected by these coating or laminating materials.

While, in principle, the surface impregnation techniques are the most desirable since the ultraviolet radiation absorbers are contained only in the surface regions of the polymer where they are needed, in practice the prior art surface impregnation techniques all suffer from certain disadvantages. Melting the polymer and the absorbers in order to diffuse the absorbers into the polymer surface suffers from the defect that the polymer, or at least its surface region, must be heated to the melting point. This may result in an uneven or wrinkled polymer surface being formed upon cooling and solidifying of the polymer. Furthermore, the physical properties of the polymer may sometimes be deleteriously affected by this melting of the polymer. In the aggressive solvent technique an ultraviolet radiation absorbing compound is dissolved in a solvent which is aggressive towards the polymer, such as polycarbonate. Typical aggressive solvents for polycarbonate include chlorinated hydrocarbons, esters, or aromatic hydrocarbons. When these solutions are applied onto the surface of a polycarbonate article the aggressive solvent functions as a softening or swelling agent for the polymer surface allowing the absorber to diffuse into the softened or swelled polymer surface regions. However, the aggressive nature of these solvents causes problems. Surface imperfections can occur during coating and prolonged contact between the polymer and the aggressive solvent can lead to etching, hazing and crazing of the polymer. Using ultraviolet radiation stabilizing solutions containing an ultraviolet radiation absorbing compound which is more soluble in the polymer than in the stabilizing solution rather sharply limits the number and type of ultraviolet radiation absorbing compounds which may be used. Also, a large volume of the stabilizing solution must be used. This requires the use of large amounts of ultraviolet radiation absorber which is a rather expensive commodity.

Thus, there is a need for an economical and effective method for protecting polymeric, particularly polycarbonate, articles from the degradation caused by ultraviolet radiation. The instant invention provides such a method.

DESCRIPTION OF THE INVENTION

In accordance with the present invention there is provided a method of producing an ultraviolet radiation resistant polycarbonate article comprising impregnating the surface layers of the polycarbonate article with an ultraviolet radiation absorber by first applying onto the surface of said article an ultraviolet radiation stabilizing composition containing an ultraviolet radiation absorbing compound and a nonaggressive liquid carrier for said compound, and then heating said article with said stabilizing composition on its surface to a temperature sufficient for said absorber to diffuse into the surface layers of said article but insufficient to deleteriously affect the physical properties of said polycarbonate resin.

In accordance with the present invention an article comprised of polycarbonate resin is formed in a conventional manner, for example by injection molding, extrusion, cold forming, vacuum forming, blow molding, compression molding, transfer molding, and the like. The article may be in any shape and need not be a finished article of commerce, that is, it may be sheet material or film which would be cut or sized or mechanically shaped into a finished article. Therefore, as used herein, the term "article" refers to any shape or form of polycarbonate resin whether finished or stock material.

The aromatic carbonate polymer used in the practice of the instant invention has recurring structural units of the formula

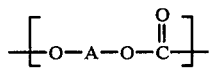
I where A is a divalent aromatic radical of the dihydric phenol employed in the polymer producing reaction. These polycarbonate resins are high molecular weight aromatic carbonate polymers which may be prepared by reacting a dihydric phenol with a a carbonate precursor such as phosgene, a haloformate or a carbonate ester.

The aromatic carbonate polymers of this invention may be prepared by methods well known in the art and described in U.S. Pat. Nos. 3,161,615; 3,220,973; 3,312,659; 3,312,660; 3,313,777; 3,666,614; and 3,989,672 all of which are incorporated herein by reference.

Also included herein are branched polycarbonates wherein a polyfunctional aromatic compound is reacted with the dihydric phenol and the carbonate precursor to provide a thermoplastic randomly branched polycarbonate wherein the recurring units of formula I contain branching groups.

The preferred polycarbonate resin is one which may be derived from the reaction of bisphenol-A with phosgene. These preferred polycarbonates have from about 10 to about 400 recurring structural units of the general formula

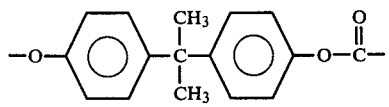

The polycarbonate should preferably have an intrinsic viscosity between about 0.3 and about 1.0, more preferably from about 0.4 to about 0.65 as measured at 25° C. in methylene chloride.

To the surface of this polycarbonate article is applied an ultraviolet radiation stabilizing composition which contains at least one ultraviolet radiation absorbing compound and at least one nonaggressive liquid carrier for said absorber. By nonaggressive is meant that the liquid carrier is nonaggresive towards the polycarbonate, i.e., it does not attack and thereby deleteriously affect the polycarbonate resin article.

The ultraviolet radiation stabilizing composition of the instant invention may be in the form of a solution of the ultraviolet radiation absorber dissolved in the nonaggressive liquid carrier, a suspension or dispersion of the absorber suspended or dispersed in the liquid carrier, or part solution and part suspension or dispersion of the absorber in the carrier. Whether the stabilizing composition is in the form of a solution, a suspension or dispersion, or part solution and part dispersion or suspension depends in part on the solubility of the particular absorber in the particular carrier with which it is combined. If the absorber is very soluble in the carrier then the stabilizing composition will be in the form of a solution. If the absorber is not very soluble in the carrier then the stabilizing composition will be in the form of a suspension or dispersion of the absorber in the carrier. If the absorber has medium solubility in the carrier then the stabilizing composition will have the character of both a solution and a suspension or dispersion with part of the amount of the absorber present being dissolved in the carrier and the remainder of the undissolved absorber being suspended or dispersed in the carrier. Also affecting the character of the stabilizing composition is the amount of the absorber present in the composition. Thus, if a small amount of an absorber having medium solubility in a particular carrier is used the stabilizing composition will tend to be in the form of a solution. If, however, a larger amount of the same absorber is used with the same carrier then the stabilizing composition will tend to be in the form of both a solution and a dispersion or suspension. Preferably the stabilizing composition should be in the form of a solution in order to achieve optimum results.

The stabilizing composition contains a stabilizing amount of the ultraviolet radiation stabilizing or absorbing compound. By stabilizing amount is meant an amount of absorber effective to stabilize the polycarbonate article against degradation by ultraviolet radiation after the polycarbonate article has been treated with the stabilizing composition. Generally, a stabilizing amount of the ultraviolet radiation absorber is present when the stabilizing composition contains from about 0.01 to about 15 weight percent of the ultraviolet radiation absorber, preferably from about 0.1 to about 10 weight percent of the ultraviolet radiation absorber, and more preferably from about 1 to about 8 weight percent of the absorber. The stabilizing composition may contain only one ultraviolet radiation absorbing compound or a combination of two or more ultraviolet radiation absorbing compounds. If two or more ultraviolet radiation absorbing compounds are present in the stabilizing composition their combined weight percentages should be from about 0.01 to about 15 weight percent of the stabilizing composition.

The ultraviolet radiation absorbers employed in the practice of this invention can be any of the known ultraviolet radiation absorbing compounds which function by reason of their ability to screen out the damaging ultraviolet portion of light due to their very high absorptivity in this region of the spectrum. These compounds include benzophenone and the benzophenone derivatives, benzotriazole and benzotriazole derivatives, benzoate esters, phenyl salicylates, derivatives of crotonic acid, malonic acid esters, and cyanoacrylates.

Included among the ultraviolet radiation absorbers which fall into the categories of benzophenone derivatives and benzotriazole derivatives are those compounds disclosed in U.S. Pat. Nos. 3,309,220; 3,049,443 and U.S. Pat. No. Re. 2,976, all of which are incorporated herein by reference. Some non-limiting examples of these compounds include:
2,2'-dihydroxybenzophenone;
2,2',4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiary butylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone;
2-(2'-hydroxy-5'-methylphenyl)-benzotriazole;
2-(2'-hydroxy-5'-tert-butylphenyl)-benzotriazole;
2-(2'-hydroxy-3'-methyl-5'-tert-butylphenyl)-benzotriazole;
2-(2'-hydroxy-5'-cyclohexylphenyl)-benzotriazole;
2-(2'-hydroxy-3',5'-dimethylphenyl)-benzotriazole;
2-(2'-hydroxy-5'-tert-butylphenyl)-5-chloro-benzotriazole; and
2-(2'-hydroxy-3'-di-tert-butylphenyl)-benzotriazole.

Two non-limiting examples of the derivatives of crotonic acid which function as ultraviolet radiation absorbers are alpha-cyano-beta-(p-methoxyphenyl)-crotonic acid methyl ester and alpha-cyano-beta-N-(2-methyl-indolinyl)-crotonic acid methyl ester. The benzoate ester ultraviolet radiation absorbing compounds include the $C_8$–$C_{20}$ alkyl and aryl benzoates, alkyl and aryl hydroxybenzoates, alkaryl and aralkyl benzoates, and alkaryl and aralkyl hydroxybenzoates.

The malonic acid esters which are ultraviolet radiation absorbing compounds include the benzylidene malonates. These benzylidene malonates are represented by the general formula

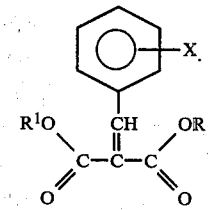

III wherein X is selected from hydrogen, hydroxyl, halogen, alkyl, preferably $C_1$–$C_{10}$ alkyl, and alkoxy, preferably $C_1$–$C_{10}$ alkoxy, radicals; and R and $R^1$ are independently selected from alkyl radicals, preferably alkyl radicals containing from 1 to about 10 carbon atoms, substituted alkyl radicals, preferably those containing from 1 to about 10 carbon atoms and hydroxyl or halogen substituents, aryl radicals, preferably the phenyl radical, alkaryl radicals, preferably those alkaryl radicals containing from 7 to about 12 carbon atoms, aralkyl radicals, preferably aralkyl radicals containing from 7 to about 12 carbon atoms, and substituted aryl radicals, preferably phenyl radicals containing hydroxyl or halogen substituents. Preferred benzylidene malonates represented by formula III are those wherein X represents an alkoxy group and R and $R^1$ are independently selected from alkyl radicals. Examples of these benzylidene malonates include diethyl paramethoxybenzylidene malonate and dimethyl paramethoxybenzylidene malonate.

Among the cyano-acrylates which are useful ultraviolet radiation absorbers are those cyano-acrylates represented by the general formula

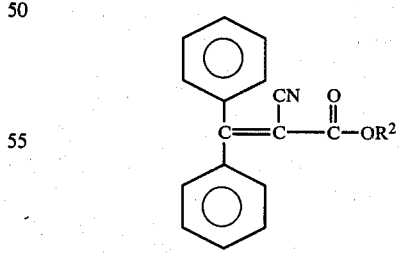

IV.

wherein $R^2$ is alkyl or hydroxyalkyl. These compounds of formula IV are disclosed in U.S. Pat. No. 4,129,667 which is incorporated herein by reference.

The preferred ultraviolet radiation absorbing compounds, for the purposes of the present process, are the benzophenones and benzophenone derivatives, benzotriazole and benzotriazole derivatives, the benzylidene malonates, and the cyano-acrylates.

The stabilizing composition contains at least one nonaggressive liquid carrier for the ultraviolet radiation absorber. This liquid carrier is nonaggressive towards the polycarbonate, i.e., it does not attack the polycarbonate and does not cause the polycarbonate to swell or soften. The stabilizing composition can contain only one liquid carrier or it may contain two or more liquid carriers. If two or more liquid carriers are present in the stabilizing composition they must be miscible with each other. Examples of preferred nonaggressive liquid carriers include hydroxy ethers, alcohols, alcohol-water mixtures, liquid aliphatic hydrocarbons, liquid cycloaliphatic hydrocarbons, and chlorofluorocarbons such as those marketed by the E. I. duPont Company under the tradename Freon, e.g., dichlorodifluoromethane, trichlorofluoromethane, and the like. Generally, it is preferred that these liquid carriers be relatively volatile, i.e. , that they volatilize at or below about 130° C.

The preferred alcohols are the aliphatic alcohols with the alkanols, particularly the $C_1$–$C_6$ alkanols, being preferred. Some nonlimiting examples of these $C_1$–$C_6$ alkanols include methanol, ethanol, propanol, isopropanol, tertiary butanol, and the like.

The preferred liquid aliphatic and cycloaliphatic hydrocarbons are the liquid saturated aliphatic and cycloaliphatic hydrocarbons containing from 5 to about 20 carbon atoms. Some nonlimiting examples of these hydrocarbons include pentane, hexane, octane, nonane, decane, undecane, the various positional isomers of the foregoing, cyclohexane, cyclopentane, cyclooctane, and the like.

The hydroxy-ethers which are useful as carriers in the stabilizing composition are compounds represented by the general formula $$R^3-O-R^4-OH \qquad V.$$

wherein $R^3$ is an alkyl or an alkoxy alkyl radical containing from 1 to about 6 carbon atoms, and $R^4$ is a divalent saturated aliphatic hydrocarbon radical containing from 1 to about 6 carbon atoms.

In the practice of the present invention the liquid carrier must not only be nonaggressive towards the polycarbonate, but should also wet the polycarbonate. Thus, for example, while water is nonaggressive towards polycarbonate it is not an effective liquid carrier for the purposes of the present invention because it does not wet the polycarbonate.

In the practice of the process of the instant invention a stabilizing composition containing the ultraviolet radiation absorber and the nonaggressive liquid carrier is applied onto the surface of a polycarbonate by any of several known methods such as spraying, flow coating, brushing, and the like. The polycarbonate article with the stabilizing composition on its surface is then heated to and kept at a temperature effective for the ultraviolet radiation absorber to diffuse into the surface layers of the polycarbonate article. Heating at the effective temperature is continued and the stabilizing composition is kept in contact with the polycarbonate article, at the effective temperature, for a period of time sufficient for the ultraviolet radiation absorber to effectively impregnate the surface layers of the polycarbonate article, i.e., for the ultraviolet radiation absorber to diffuse throughout the surface layers of the polycarbonate article in concentrations sufficient to provide protection against the deleterious effects of ultraviolet radiation. Since the stabilizing composition is nonaggressive towards the polycarbonate resin there is no upper time limit that the composition can remain in contact with the polycarbonate at the effective temperature. Rather, the upper time limit is governed by such secondary considerations as speed of processing of the polycarbonate article, rate of evaporation of the carrier, and the like. The minimum period of time that the stabilizing composition is kept in contact with the polycarbonate article at the effective temperature is that period of time which is sufficient for the absorber to impregnate the surface layers of the polycarbonate in concentrations effective to provide protection to the polycarbonate resin against degradation by ultraviolet radiation. This minimum period of time generally depends to a certain degree upon the particular ultraviolet radiation absorber present in the stabilizing composition, the particular liquid carrier used, and the temperature of the polycarbonate article coated with the stabilizing composition. Generally, the hot stabilizing composition and the hot polycarbonate article are kept in contact with each other from about 5 seconds to about 2 hours, preferably from about 30 seconds to about 30 minutes.

It is critical to the practice of the present process that the polycarbonate article with the stabilizing composition on its surface be heated to a temperature sufficiently high for the ultraviolet radiation absorber to impregnate the surface layers of the polycarbonate article in concentrations effective to provide protection against degradation of the polycarbonate resin by ultraviolet radiation. If the polycarbonate article having a layer of the stabilizing composition on its surface is not heated to a temperature effective for the impregnation of the absorber into the polycarbonate surface layers to take place the ultraviolet radiation absorber will not diffuse into or impregnate the surface layers of the polycarbonate resin and, consequently, the polycarbonate resin will not be stabilized against ultraviolet radiation. Generally, the minimum temperature at which impregnation of the polycarbonate resin by the ultraviolet radiation absorber takes place is about 65° C. Preferably the polycarbonate article coated with the stabilizing composition is heated to at least about 75° C., as at this temperature and above the ultraviolet radiation absorbing compound generally diffuses rapidly and in large amounts into the surface layers of the polycarbonate resin. The maximum temperature of the polycarbonate is governed by the fact that the temperature to which the polycarbonate with the stabilizing composition thereon is heated be not sufficiently high so as to deleteriously affect the physical properties of the polycarbonate resin. Thus the upper temperature limit is below about 150° C. which is the glass transition temperature of the polycarbonate resin. Preferably it should be below about 135° C., the temperature at which bubbles and other imperfections begin to appear in the polycarbonate.

Thus in the practice of the process of the instant invention a polycarbonate resin article having a coating layer of the stabilizing composition on its surface is heated to an effective temperature of from between about 65° C. and about 149° C., and maintained at this temperature for a period of time of from about 5 seconds to about 2 hours. For optimum results and operating conditions the coated, with the stabilizing composition, polycarbonate article is heated to and maintained at a temperature of between about 75° C. and about 135° C.

After heating for the requisite period of time at the effective temperature the polycarbonate resin article is cooled to room temperature and washed, for example with isopropanol, to remove any residue of the stabilizing composition from the surface of the polycarbonate article. The washing of the surface of the polycarbonate article is an optional procedure.

It is to be understood that the polycarbonate resin used in the practice of the present invention may contain incorporated therein various known additives such as fillers, plasticizers, flame retardants, and the like.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

A 10 mil thick film of polycarbonate was flow coated with a stabilizing composition containing a 3% solution of 2,2',4,4'-tetrahydroxybenzophenone in 2-butoxyethanol and allowed to stand at room temperature for less than one minute. The coated film was then heated at 75 degrees C. for ten minutes. After cooling the film was washed with isopropanol. This treatment did not visibly alter the optical quality of the film. The treated film was placed in the sample beam of a Perkin-Elmer Model Coleman 575 Spectrophotometer and an untreated film was placed in the reference beam. The absorbance of the treated film was 1.95 in the 290–350 nm. range. Using the relationship $A = \log I_o/I$ where A is the absorbance, $I_o$ is the intensity of the incident light, and I is the intensity of transmitted light, it was determined that an absorbance of 1.95 corresponds to absorption of more than 98% of the incident light at λmaximum by the treated film.

EXAMPLE 2

A 10 mil thick film of polycarbonate was flow coated with a 3% solution of Cyasorb 5411 (a derivative of benzotriazole ultraviolet radiation absorber marketed by American Cyanimid Co.) in 2-butoxyethanol and allowed to drain for less than one minute. The coated film was then heated at 125 degrees C. for two hours. After cooling the film was washed with isopropanol. This treatment did not visibly alter the optical quality of the film. The treated film was placed in the sample beam of a Perkin-Elmer Model Coleman 575 Spectrophotometer and an untreated film was placed in the reference beam. The absorbance of the treated film at max. was 2.25 in the 290–350 nm. range. Using the relationship $A = \log I_o/I$ where A is the absorbance, $I_o$ is the intensity of the incident light, and I is the intensity of transmitted light, it was determined that an absorbance of 2.25 at λmax. corresponds to absorption of more than 99% of the incident light at λmaximum by the treated film.

EXAMPLE 3

The procedure of Example 2 was substantially repeated except that the stabilizing composition contained 3% of Uvinul N-539 (a cyanoacrylate ultraviolet radiation absorber marketed by GAF Corp. and represented by general formula IV wherein $R^2$ is a $C_8H_{17}$ radical). The absorbance of the treated film was found to be 1.2, which corresponds to absorption of 94% of the incident ultraviolet light by the treated film. The optical quality of the treated film was not visibly altered by this treatment.

EXAMPLE 4

The procedure of Example 2 was substantially repeated except that the stabilizing composition contained 3% of Cyasorb UV-3100 (a benzylidene malonate ultraviolet radiation absorber marketed by American Cyanimid Co. and represented by general formula III wherein X is the $OCH_3$ radical and R and $R^1$ are ethyl radicals). The absorbance at λmax. of the treated film was greater than 3, which corresponds to absorption at λmax. of more than 99% of the incident ultraviolet light by the treated film. The optical quality of the treated film was not visibly altered by this treatment.

EXAMPLE 5

The procedure of Example 2 was substantially repeated except that the stabilizing composition contained 3% of Uvinul N-35 (a cyanoacrylate ultraviolet radiation absorber marketed by GAF Corp. and represented by formula IV wherein $R^2$ is an ethyl radical). The absorbance of the treated film was found to be 2.5, which corresponds to absorption of more than 99% of the incident ultraviolet light by the treated film. The optical quality of the treated film was not visibly altered by this treatment.

EXAMPLE 6

The procedure of Example 2 was substantially repeated except that the stabilizing composition contained 3% of Cyasorb UV-1988 (a benzylidene malonate ultraviolet radiation absorber marketed by American Cyanimid Co. and represented by general formula III wherein X is the $OCH_3$ radical and R and $R^1$ are methyl radicals). The absorbance of the treated film was found to be greater than 3, which corresponds to absorption of more than 99.9% of the incident ultraviolet light by the treated film. The optical quality of the treated film was not visibly altered by this treatment.

EXAMPLE 7

The procedure of Example 2 was substantially repeated except that the stabilizing composition contained 3% of 2-hydroxy-4-dodecyloxybenzophenone. The absorbance of the treated film was found to be 1.7, which corresponds to absorption of 98% of the incident ultraviolet light by the treated film. The optical quality of the treated film was not visibly altered by this treatment.

EXAMPLE 8

The procedure of Example 2 was substantially repeated except that the stabilizing composition contained 3% of 2,2', 4,4'-tetrahydroxybenzophenone. The absorbance at λmaximum of the treated film was found to be 2.6, which corresponds to absorption at λmaximum of more than 99% of the incident ultraviolet light by the treated film. The optical quality of the film was not visibly altered by this treatment.

EXAMPLE 9

The procedure of Example 2 was substantially repeated except that the stabilizing composition contained 3% of 2-hydroxy-4-methoxybenzophenone. The absorbance at λmaximum of the treated film was found to be 2.5, which corresponds to absorption at λmaximum of more than 99% of the incident ultraviolet light by the treated film. The optical quality of the film was not visibly altered by this treatment.

EXAMPLE 10

The procedure of Example 2 was substantially repeated except that the stabilizing composition contained 3% of Tinuvin P (a derivative of benzotriazole ultraviolet radiation absorber marketed by Ciba-Geigy Corp.). The absorbance of the treated film was found to be 2.5, which corresponds to absorption of more than 99% of the incident ultraviolet light by the treated film. The optical quality of the film was not visibly altered by this treatment.

EXAMPLE 11

Ten mil thick polycarbonate films were flow coated with a solution of 5% Cyasorb UV-3100 in 50% aqueous butoxyethanol, drained for about 2 minutes, and then heated at 125 degrees C. for various amounts of time. After cooling and washing with isopropanol, the absorbance of each film was measured in accordance with the procedure of Example 1. The results are set forth in Table 1.

EXAMPLE 12

A 10 mil thick film of polycarbonate was flow coated with a solution of 3% Cyasorb UV-1988 in 2-butoxyethanol, drained for less than 1 minute, and then heated at 75 degrees C. for 5 minutes. After cooling and washing with isopropanol, the absorbance was found to be greater than 3, which corresponds to absorption of more than 99.9% of the incident ultraviolet light by the treated film. The optical quality of the treated film was not visibly altered by this treatment. This treated film and an untreated film were placed on a rotating table 10 inches below two General Electric Company RS-sunlamps. After 7 days the untreated film was yellow while the treated film was colorless.

EXAMPLE 13

This Example illustrates a method falling outside the scope of the present invention. This method, which does not involve heating the polycarbonate coated with the stabilizing composition, is not effective in providing protection to polycarbonate resins against degradation by ultraviolet radiation. A 10 mil thick polycarbonate film was flow coated with a solution of 3% Cyasorb UV-1988 in 2-butoxyethanol. After standing at room temperature for 18 hours the film was washed with isopropanol. The absorbance of the film was measured in accordance with the procedure set forth in Example 1 and was found to be 0. This absorbance of 0 indicates that no surface impregnation of the polycarbonate resin by the ultraviolet radiation absorber occurred.

EXAMPLE 14

This example illustrates a prior art method using aggressive solvents to impregnate an ultraviolet radiation absorber into the surface layers of polycarbonate. A solution was prepared by dissolving 5% 2-(2'-hydroxy-3',5'-di-tert-butyl-phenyl)-benzotriazole in 1 part by weight of 1,2-dichloropropane and 10 parts by weight of benzene. A 10 mil thick polycarbonate film was flow coated with this solution and allowed to stand at room temperature for 30 minutes. The film was hazy both before and after washing with isopropanol. The absorbance of the film was measured in accordance with the procedure set forth in Example 1 and was found to be greater than 3, which corresponds to absorption of more than 99.9% of the incident ultraviolet light. Thus although this film was well protected against degradation by ultraviolet radiation it was unsatisfactory due to its haziness.

EXAMPLE 15

This example illustrates another prior art method using aggressive solvents to impregnate an ultraviolet radiation absorber into the surface layers of polycarbonate. A solution was prepared by dissolving 4.5% of 2-(2'-hydroxy-5'-methylphenyl)-benzotriazole in 35 parts by weight of tetrachlorodifluoroethane and 65 parts by weight of 1,2-dichloroethane. The solution was sprayed one one 10 mil thick polycarbonate film and flow coated on another 10 mil thick polycarbonate film. Both methods of application led to flow lines on the film, some crazing of the polycarbonate resin, and other surface imperfections. After standing at room temperature for 1 hour both samples were washed with isopropanol and their absorbance was measured in accordance with the procedure set forth in Example 1. Their absorbance was greater than 2, corresponding to absorption of about 99% of the incident ultraviolet light. Thus although these films were well protected against ultraviolet light they were generally unsatisfactory because of flow lines on the surface, crazing, and other surface imperfections.

EXAMPLE 16

This example illustrates still another prior art method utilizing aggressive solvents to impregnate the surface layers of polycarbonate with an ultraviolet radiation absorber. A solution was prepared by dissolving 3.5% of 4-methoxy-2-hydroxybenzophenone in 47.5 parts by weight of isopropanol, 30 parts by weight of 1,2-dichloroethane, and 22.5 parts by weight of water. A 10 mil thick polycarbonate film was flow coated with this solution and allowed to stand at room temperature for 30 minutes. Hazing of the film occurred both before and after washing the film with isopropanol. After washing with isopropanol the absorbance of the treated film was obtained in accordance with the procedure of Example 1. The absorbance of this film was found to be greater than 2, which corresponds to absorption of about 99% of the incident ultraviolet light. Thus although this film, like those in Examples 14 and 15, was well protected against ultraviolet light it was not acceptable because, just as the films in Examples 14 and 15, it had deteriorated physically after treatment.

TABLE I

| Time at 125° C. | Absorbance at λmax |
| --- | --- |
| 0 minutes | 0 |
| 1 minute | 1.9 |
| 2 minutes | 2.3 |
| 10 minutes | 2.4 |
| 15 minutes | 2.4 |

As can be seen from the foregoing Examples the present invention is effective in surface impregnating a polycarbonate resin with an ultraviolet radiation absorber without deleteriously affecting the physical properties of the polycarbonate resin or causing unsightly surface blemishes on the treated article.

The success of the instant process in providing protection for polycarbonate resins against degradation by ultraviolet radiation is surprising and rather unexpected. Those skilled in the art could have expected in view of the teachings of the prior art that heating a polycarbonate resin with a stabilizing composition containing an ultraviolet radiation absorber and a nonaggressive liquid carrier on its surface to a temperature below the glass transition temperature of the polycarbonate would result only in volatilization of the carrier and/or the stabilizer and no surface interaction between the absorber and the polycarbonate.

The foregoing disclosure of this invention is not to be considered as limiting, since many variations may be made by those skilled in the art without departing from the scope or spirit of the foregoing description.

What I claim as new and desire to secure by Letters Patent of the United States is:

1. A process for producing a polycarbonate resin article having an improved resistance to degradation by ultraviolet radiation comprising impregnating the surface layers of said article with at least one ultraviolet radiation absorber by contacting the surface of said article with an ultraviolet radiation stabilizing composition consisting essentially of (i) at least one ultraviolet radiation absorbing compound, and (ii) at least one liquid carrier which is nonaggressive towards and wets polycarbonate selected from the class consisting of alcohols, hydroxy ethers, alcohol-water mixtures, liquid aliphatic hydrocarbons, liquid cycloaliphatic hydrocarbons, and chlorofluorocarbons, and thereafter heating said article containing said stabilizing composition on its surface for a period of time at a temperature sufficient for said ultraviolet radiation absorbing compound to effectively impregnate the surface layers of said article but insufficient to deleteriously affect the physical properties of said polycarbonate.

2. The process of claim 1 wherein said polycarbonate article is heated at a temperature of between about 65° C. and about 149° C.

3. The process of claim 2 wherein said polycarbonate article is heated at a temperature of between about 75° C. and about 135° C.

4. The process of claim 3 wherein said ultraviolet radiation absorbing compound is selected from the class consisting of benzophenone, derivatives of benzophenone, benzotriazole, derivatives of benzotriazole, cyanoacrylates, and benzylidene malonates.

5. The process of claim 4 wherein said cyanoacrylates are compounds represented by the general formula

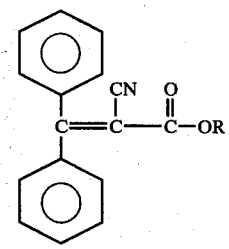

wherein R represents an alkyl or hydroxyalkyl radical.

6. The process of claim 4 wherein said stabilizing composition contains an amount of ultraviolet radiation absorbing compound sufficient to diffuse into the surface layers of said polycarbonate article in concentrations effective to protect said polycarbonate against degradation by ultraviolet radiation.

7. The process of claim 6 wherein said stabilizing composition contains from about 0.01 to about 15 weight percent of ultraviolet radiation absorbing compound.

8. The process of claim 7 wherein said stabilizing composition contains from about 0.1 to about 10 weight percent of ultraviolet radiation absorbing compound.